United States Patent [19]
Schoffelman et al.

[11] Patent Number: 6,119,170
[45] Date of Patent: Sep. 12, 2000

[54] METHOD AND APPARATUS FOR TCP/IP MULTIHOMING ON A HOST SYSTEM CONFIGURED WITH MULTIPLE INDEPENDENT TRANSPORT PROVIDER SYSTEMS

[75] Inventors: Daniel J. Schoffelman; Carter E. Massey, both of Phoenix; Charles F. LaCasse, III; Gary A. Mohr, both of Glendale, all of Ariz.

[73] Assignee: Bull HN Information Systems Inc., Billerica, Mass.

[21] Appl. No.: 08/999,250

[22] Filed: Dec. 29, 1997

[51] Int. Cl.[7] .......................... G06F 15/173; G06F 15/16
[52] U.S. Cl. ...................... 709/244; 709/213; 709/224; 709/227
[58] Field of Search ................................ 709/239, 213, 709/218, 219, 220, 231, 238, 244, 104, 221, 223, 224, 227, 300, 305; 364/131, 132, 474.11; 395/182.09, 182.1

[56] References Cited

U.S. PATENT DOCUMENTS

| | | | |
|---|---|---|---|
| 5,109,512 | 4/1992 | Bahr et al. | 395/650 |
| 5,319,782 | 6/1994 | Goldberg et al. | 709/104 |
| 5,426,773 | 6/1995 | Chabanet et al. | 714/4 |
| 5,485,579 | 1/1996 | Hitz et al. | 709/221 |
| 5,528,750 | 6/1996 | Lubart et al. | 714/15 |
| 5,630,128 | 5/1997 | Farrell et al. | 709/103 |
| 5,727,178 | 3/1998 | Pletcher et al. | 711/202 |
| 5,805,804 | 9/1998 | Laursen et al. | 709/238 |
| 5,870,550 | 2/1999 | Wesinger, Jr. et al. | 709/218 |

OTHER PUBLICATIONS

Stevens, W. Richard "Unix Network Programming" PTR Prentice Hall, 1990.

*Primary Examiner*—Zarni Maung
*Assistant Examiner*—Jason D. Cardone
*Attorney, Agent, or Firm*—Faith F. Driscoll; John S. Solakian

[57] ABSTRACT

A multihomed host system is configured with independent front end processor transport providers, each having its own network protocol stack and each being connected to a different TCP/IP network or subnetwork or to different portions of the same network which in turn connects to an internetnetwork. The host system software includes a TCP/IP Transport Agent located between a sockets interface and the host system's input/output supervisor and driver facilities. The TCP/IP Transport Agent is enhanced to include a FEP Multihoming and Routing component for providing a multihoming capability. The FEP Multihoming and Routing component utilizes a plurality of components which are configured from the same administrator supplied configuration and static routing information furnished to the FEPs for configuring their respective TCP/IP stack facilities. When so configured, the TCP/IP Transport Agent is able to provide full multihoming support for a variety of requests from the different types of applications being run on the host system.

33 Claims, 18 Drawing Sheets

FEP_ROUTE_TABLE_ENTRY STRUCTURE 10-252b

| | |
|---|---|
| dest_addr | destination IP address for route (host or net) |
| dest_mask | Portion of dest_addr to use |
| next_pointer | pointer to next entry in chain from hash table |
| gateway | IP address for gateway |
| fep_mask | bit mask, with bit positions corresponding to configured FEPs, and bit set to 1 if FEP is valid for this route |
| fep_mask_count | number of bits turned on in fep_mask |
| metric | cost of route, in hops |

Figure 3b

ROUTE_MASK STRUCTURE 10-254-4

| Metric | count | FEP_mask |
|---|---|---|
| 0 | count of FEPs in mask | Bit mask of valid FEPs for this metric |
| 1 | " | " |
| . | " | " |
| . | | |
| 15 | " | " |

FEP_TABLE STRUCTURE

| 0 | 1 | ... | num_FEPs-1 |
|---|---|---|---|
| ipaddr<br>netmask<br>FEP addr info<br>FEP_is_up | ipaddr<br>netmask<br>FEP addr info<br>FEP_is_up | | ipaddr<br>netmask<br>FEP addr info<br>FEP_is_up |

FEPNET STRUCTURE

| Index | localnet | 0 | 1 | ... | num_FEPs-1 |
|---|---|---|---|---|---|
| 0 | num_ent<br>subnet ip addr<br>netmask | FEPa index | FEPb index | | |
| 1 | num_ent<br>subnet ip addr<br>netmask | FEPc index | | | |
| . | | | | | |
| . | | | | | |
| num_FEPs-1 | | | | | |

Part of 10-256

FEP_ROUTE-TABLE ADD ROUTE FUNCTION:

```
add_route(dest, netmask, gw, metric)

sr_ptr = FEP_ROUTE_HASH[hash(dest)];
do while sr_ptr NOT = NULL
        if dest = sr_ptr->dest_addr AND netmask = sr_ptr->dest_mask
        AND if gw = sr_ptr->gateway // updated route
                sr_ptr->metric = metric
                return
        fi
od
allocate rt_ptr = new FEP_ROUTE_TABLE_ENTRY
rt_ptr->dest_addr = dest
rt_ptr->dest_mask = netmask
rt_ptr->gateway = gw
rt_ptr->metric = metric match = FALSE
do i=0 to num_FEPs-1
        if (FEPNET[i].subnet_ip_addr = (gw BITWISE_AND
                        FEPNET[i].netmask)
                set bits in rt_ptr->fep_mask corresponding to the
                        filled FEP entries
                in FEPNET[i]
                rt_ptr->fep_mask_count = FEPNET[I].num_ent
                match = TRUE
od
if match = FALSE then
        delete FEP_ROUTE_TABLE_ENTRY pointed to by rt_ptr
        return //can't route through gateway if no FEP
                        addressability to it
fi // link to hash table
rt_ptr->next_pointer = FEP_ROUTE_HASH[hash(dest)]
FEP_ROUTE_HASH[hash(dest)] = rt_ptr
return
```

*Figure 4a*

GET-ROUTE-MASK FUNCTION:

```
get_route_mask(dest, routemask)

found_route = FALSE
sr_ptr = FEP_ROUTE_HASH[hash(dest)];
do while sr_ptr NOT = NULL
        if (dest BITWISE_AND sr_ptr->dest_mask) =
     (sr_ptr->dest_addr BITWISE_AND sr_ptr->dest_mask)
                BITWISE_OR sr_ptr->fep_mask into
                        routemask[sr_ptr->metric].FEP_mask
                Increment routemask[sr_ptr->metric].count by
                        sr_ptr->fep_mask_count
                found_route = TRUE
        fi
od if found_route then return // Now try default routes
sr_ptr = FEP_ROUTE_HASH[hash(0.0.0.0)];
do while sr_ptr NOT = NULL
        if (dest BITWISE_AND sr_ptr->dest_mask) =
     (sr_ptr->dest_addr BITWISE_AND sr_ptr->dest_mask)
                BITWISE_OR sr_ptr->fep_mask into
                        routemask[sr_ptr->metric].FEP_mask
                Increment routemask[sr_ptr->metric].count by
                        sr_ptr->fep_mask_count
        fi
od
```

*Figure 4b*

GET_FEP_INDEX FUNCTION:

```
get_fep_index(routemask)

do i = 0 to 15
    if routemask[i].count > 0 then
        x = random number in range 1-routemask[i].count
        fep_index = bit position of the xth bit in
                    routemask[i].FEP_mask
        set the xth bit in routemask[i].FEP_mask to 0
        decrement routemask[i].count
        return fep_index
    fi
od
return FAILURE
```

*Figure 4c*

FEPNET TABLE ADD ENTRY FUNCTION:

```
add_fepnet_entry(ip_addr, subnet_mask, FEPx_index)

do i=0 to num_FEPs-1
    if FEPNET[i].num_ent = 0  // 1st time for this subnet
        FEPNET.entry[FEPNET[i].num_ent] = FEPx_index
        FEPNET[i].subnet_ip_addr =
                    ip_addr BITWISE_AND subnet_mask
        FEPNET[i].netmask = subnet_mask
        Increment FEPNET[i].num_ent
        Return
    fi
    if (FEPNET[i].subnet_ip_addr =
                    ip_addr BITWISE_AND subnet_mask) AND
                    FEPNET[i].netmask = subnet_mask
        FEPNET.entry[FEPNET[i].num_ent] = FEPx_index
        Increment FEPNET[i].num_ent
        Return
    fi
od
```

*Figure 4d*

MULTI_BIND FUNCTION:

```
// Multi_bind is called when binding to INADDR_ANY
multi_bind(sock_id, port)

if port = 0 // caller wants port assigned
        requested_port = assign_port(SOCKET_TABLE[sock_id].protocol)
        if port = 0 // no ports available
                return "NO PORTS AVAILABLE" error to caller
else
        requested_port = port
        if reserve_port(port, SOCKET_TABLE[sock_id].protocol) =
                FAILURE
                return "PORT IN USE" error to caller
        fi
fi do i=0 to num_FEPs-1
        if FEP_TABLE[i].fep_is_up
                make "bind" request to FEP[i] on port requested_port
                putting FEP connection information in
                        SOCKET_TABLE[sock_id].TPPD[i]
        else
                make deferred request to make "bind" request to FEP[i]
                on port requested_port
                putting FEP connection information in
                        SOCKET_TABLE[sock_id].TPPD[i]
        fi
od wait for at least (non-deferred) "bind" requests to complete
if bind failed due to "PORT_IN_USE" on FEP[i]
        // should only be true when caller specified port
        close connection on any other FEPs in range 0 to num_FEPs-1
        free_port(requested_port, SOCKET_TABLE[sock_id].protocol)
        return "PORT IN USE" error to caller
fi
```

*Figure 4e*

RESERVE_PORT FUNCTION:

```
// allocate a port in range 1024-5000 (by TCP/IP convention, the
// range of dynamically assigned ports)
// called by multi_bind
assign_port(protocol)

enter critical section  // keep more than one program out of here
if protocol = TCP
        p = last_TCP_port_used + 1
        do while p NOT = last_TCP_port_used
                if p > 5000 // Above highest port we can assign
                        p = 1024 // Start at bottom
                fi
                if TCP_port_reserved[p] is FALSE
                        set TCP_port_reserved[p] to TRUE
                        last_TCP_port_used = p
                        exit critical section
                        return p
                fi
        increment p
        od
        exit critical section
        return 0 // no ports available
else if protocol = UDP
        p = last_UDP_port_used + 1
        do while p NOT = last_UDP_port_used
                if p > 5000
                        p = 1024
                fi
                if UDP_port_reserved[p] is FALSE
                        set UDP_port_reserved[p] to TRUE
                        last_UDP_port_used = p
                        exit critical section
                        return p
                fi
        increment p
        od
        exit critical section
        return 0 // no ports available
fi
```

*Figure 4f*

ASSIGN_PORT FUNCTION:

```
// mark the requested port assigned (if in range 1024-5000)
// called by multi_bind and non-multihomed bind
// return SUCCESS if not already in use; FAILURE if it is
// the non-multihomed bind() function will ignore FAILURE, since
// the port may be available on the specified FEP
assign_port(port, protocol)

if port < 1024 OR port > 5000
        return SUCCESS // not in a range we care about
fi
enter critical section  // keep more than one program out of here
if protocol = TCP
        if TCP_port_reserved[port] is FALSE
                set TCP_port_reserved[port] to TRUE
                exit critical section
                return SUCCESS
        fi
        exit critical section
        return FAILURE
else if protocol = UDP
        if UDP_port_reserved[port] is FALSE
                set UDP_port_reserved[port] to TRUE
                exit critical section
                return SUCCESS
        fi
        exit critical section
        return FAILURE
fi
```

*Figure 4g*

FREE_PORT FUNCTION:

```
// mark the requested port available (if in range 1024-5000)
// called on close and by mult_bind
free_port(port, protocol)

if port < 1024 OR port > 5000
    return SUCCESS // not in a range we care about
fi
if protocol = TCP
    set TCP_port_reserved[port] to FALSE
    return
else if protocol = UDP
    set UDP_port_reserved[port] to FALSE
    return
fi
```

*Figure 4h*

ENHANCED TCP_CONNECT FUNCTION:

```
// This is added to the existing TCP Connection function
// (Part of Figure 10-258)
// Key input to this function are dest, the destination IP address,
// and fd, the transport endpoint (Socket) on which we are to connect get_route_mask(dest, routemask)  // given dest, get a routemask do forever // keep trying FEPs
        fep = get_fep_index(routemask)
        if return value is FAILURE
                return FAILURE to caller
        fi
        // There are two cases here:  we are bound already to one
        // or more FEPs, or we have not done a bind yet (known as an
        // implicit bind).
        if socktable[fd] is not yet bound
                do conventional "bind" request for fep,
                        setting SOCKET_TABLE[fd].TPPD[fep]
                // assigns and reserves arbitrary port
        if socktable[fd] is bound, and SOCKET_TABLE[fd].TPPD[fep]
            contains an initialized connection to fep
                send connect request over fep, using
                        SOCKET_TABLE[fd].TPPD[fep]
                if connect request fails because of TCP
                        "connection refused",
                        return FAILURE to caller // we got there,
                                                 // but system won't
                                                 // talk with us, no use
                                                 // retrying
                fi
                if connection request succeeds,
                        // Clean up other FEPs not selected
                        do i = 0 to num_FEPs-1
                                if i not = fep
                                        close FEP connection (if any)
                                                contained in
                                                SOCKET_TABLE[fd].TPPD[i]
                                Fi
                        od
                        return SUCCESS to caller
                else // connection failed
                        close SOCKET_TABLE[fd].TPPD[fep]
                fi
        fi
od
```

*Figure 4i*

ENHANCED UDP_SENDTO FUNCTION:

```
// This is added to the existing UDP Sendto function
// (Part of Figure 10-258)
// Key input to this function are dest, the destination IP
// address,fd, the transport endpoint (Socket) on which we are to
// send data, and data, the buffer to be sent if not yet bound
    multi_bind(sockid, port)
fi
get_route_mask(dest, routemask)  // given dest, get a routemask do forever
    fep = get_fep_index(routemask)
    if return value is FAILURE
        return FAILURE to caller
    fi
    if socktable[fd] contains an initialized connection to fep,
        send data over fep to dest
        return SUCCESS to caller
    fi
od
```

*Figure 4j*

METHOD AND APPARATUS FOR TCP/IP MULTIHOMING ON A HOST SYSTEM CONFIGURED WITH MULTIPLE INDEPENDENT TRANSPORT PROVIDER SYSTEMS

BACKGROUND OF THE INVENTION

1. Field of Use

The present invention relates to systems and methods for supporting network communications and more particularly to systems and methods for providing a multihoming capability.

2. Prior Art

As is well known in the art, a computer network is a communication system for connecting end-systems referred to as hosts. An internet or internetwork is the connection of two or more distinct networks so that the computers on one network are able to communicate with computers on another network. One way of connecting two distinct physical networks is to have a gateway that is attached to both networks. The gateway is used to pass information from one network to the other network. In the well-known Open Systems Interconnection (OSI) seven layer network reference model, the term used to describe the interconnection depends on the layer at which the connection takes place. For example, a specific kind of "gateway" called a router typically operates at the third or network layer which is defined as the layer that builds data packets and indicates the type of frame which has been built or must be built by the second or data link layer that controls the movement of data frames and rearranges the data to identify various fields.

The network layer sends data packets to the fourth or transport layer which ensures reliable delivery of data packets by following a specific protocol which adds to the error correction facilities of the lower levels. In the case of the TCP/IP protocol suite, the term gateway refers to a network level router. In the UNIX based systems, a host system may have more than one network connection, possibly employing more than one type of communications interface, as for example, an Ethernet interface and a token ring interface. When a host system is connected to more than one interface thus having more than one IP address, the host system is said to be "multihomed".

A traditional reason for having a system "multihomed" has been for the purpose of operating the system as a router. Such systems are usually small and low in cost. Hence, the more costly, enterprise systems are not typically used to function as routers or gateways. However, it has been noted that there are several other important reasons for an enterprise system to have multihoming capabilities. These reasons are: (1) to allow a host system to communicate with separate networks in certain situations (e.g. for security reasons); (2) to allow a large host system to survive the loss of hardware components in the paths of the communication interface, particularly in those systems which have multiple I/O processors; and, (3) to allow a large host system to have communication bandwidth in excess of the capability of a single communication interface.

In prior art arrangements, the multihomed host system traditionally uses a single stack implementation in which kernel software allows sharing of a single network protocol stack by multiplexing the IP layer (i.e., OSI layer 3). An example of such a multihomed host system in a network router application is described in Chapter 4 of the text entitled "Unix Network Programming" by W. Richard Stevens, copyright 1990 by PTR Prentice Hall. While such arrangements provide the ability to manage different network interfaces, such hosts do not operate as enterprise systems providing multiple network connections which would provide greater capacity and the ability to off-load communications processing.

The ability to off-load communications protocol functions by using front-end processors (FEPs) is particularly advantageous for host systems. An example of this type of system is described in an article entitled "GCOS 8 System Interoperability in Heterogeneous Distributed Networks" by Mort Davis published in Volume 6, No.2 of the Groupe Bull Technical Update, copyright 1996 by Bull HN Information Systems Inc. and Bull S. A.

By way of background, in this type of system, the host system supports applications and performs the functions associated with the presentation and, when applicable, session layers while the FEPs perform the functions associated with the transport, network, link and physical layers. In greater detail, the host system TCP/IP applications request transport services via Sockets or XTI APIs from a TCP/IP Transport Agent, which in turn requests the actual transport services from an FEP actually providing the network access connection. Traditionally, each particular application has been able to only easily use a single IP address, associated with a particular FEP, which provides network access. In the case of a default request or a request to use any or all IP addresses (i.e., in sockets terms "INADDR_ANY"), the system had to chose or designate a default FEP and IP address, in fact not honoring the request for "any and all". Hence, this arrangement precludes the use of more than one FEP, unless the application was explicitly coded to access them. Thus, this arrangement is unable to provide full multihoming support. For further information on multihoming, reference may be made to the publications entitled, "Communications Sockets, Sockets Administrator's Guide, GCOS 8", Copyright 1996, Bull HN Information Systems Inc. Publication Number RG44, Rev02, and "Communications SOCKET LIBRARY, Programmer's Guide, Socket Internetworking, GCOS 8", Copyright 1995, Bull HN Information Systems Inc. Publication Number LC02, Rev02.

An additional issue inherent in FEP-based solutions is that FEPs are independent entities from the host system, which can crash or fail independently of the host. Traditionally, applications were very sensitive to FEP failures. For full multihoming support, applications must be isolated from FEP failures as much as possible.

Accordingly, it is a primary object of the present invention to provide a multihoming capability for a host system which can support multiple network connections for providing redundancy and greater capacity, without application involvement. More specifically, it is an object to provide a system which allows full support of the "INADDR_ANY" concept on a system with FEPs.

It is a further more specific object of the present invention to provide a multihomed host system which is able to spread communications load between network connections and provide the ability to recover from network connection failures through the use of redundant components and paths.

SUMMARY OF THE INVENTION

The above objects are achieved in a preferred embodiment of the multihomed host of the present invention. The multihomed host system is configured with independent TCP/IP transport providers corresponding to front end processors (FEPs), each having its own network protocol stack.

The FEPs can be connected to different TCP/IP networks or subnetworks, or to different portions of the same network which in turn can connect to an internetnetwork. In the host system, each FEP operates as a peripheral device which operatively connects to the host system's operating system.

In the previous art, the host operating system software includes a "TCP/IP Transport Agent" located between one or more application interfaces (e.g. sockets, XTI) and the host system's input/output supervisor and driver facilities. The TCP/IP Transport Agent provides a set of common system wide transport interface services for supporting the different user application interfaces without having to make any changes to such interfaces. The invention is directed to enhancing the TCP/IP Transport Agent through the addition of a FEP Multihoming and Routing Component which provides full multihoming support, using configuration information to determine how to best use the available FEPs. The TCP/IP Transport Agent through the use of one or more FEP-specific transport provider protocols obtains services from multiple FEP transport providers as if the host included only a single stack implementation while still maintaining the advantages of using an FEP based architecture.

In the preferred embodiment, the FEP Multihoming and Routing Component utilizes a number of components such as routing and FEP tables which are built and manipulated by specific functions included in the FEP Multihoming and Routing Component. The routing table contains a plurality of locations which are initially configured to store static route information which defines available connection paths to destination hosts based on the configuration of host FEPs. More specifically, each entry contains a destination address (host or network), an address of the IP gateway to use to locate the configured destination and a metric value defining the number of "hops" to get to the destination, with default information specifying the route to use if no specific routes are appropriate. The FEP table stores entries defining the configured FEPs.

In the preferred embodiment, configuration files are constructed by a system administrator which contain pertinent information about the set of configured FEPs and initial static routes. At system initialization, in addition to being provided to the configured FEPs for organizing their TCP/IP stacks, the same information contained in the configuration files can be used to configure the routing and FEP tables. During operation, depending on the type of application, the TCP/IP Transport Agent uses its FEP Multihoming and Routing component to provide full multihoming support.

For example, in the case of a server type application wherein the application is "bound" to a specific TCP or UDP port ("well-known" port) on INADDR_ANY, the TCP/IP Transport Agent invokes a multibind support function of the FEP Multihoming and Routing component which attempts to bind to the specified port on each configured FEP. When one of the configured FEPs successfully binds to the port, the bind operation is defined to have "completed" from an application point of view. For each bind request that cannot be immediately handled by an FEP, the TCP/IP Transport Agent FEP table entry associated with that FEP is marked as restartable and the TCP/IP Transport Agent will periodically retry these requests at an established time interval until binding succeeds.

For a client type application wherein the UDP or TCP port is arbitrarily assigned, the TCP/IP Transport Agent's FEP Multihoming and Routing component will utilize certain support routines to obtain the same "arbitrary" port on each configured FEP. It does this by assigning an available port from a host-resident table and then attempts to obtain the same port on each subsequent FEP, returning control to the application when at least one FEP has bound the port, and periodically retrying the other FEPs until they succeed. In this case, all port assignments on all FEPs are recorded in a resident port table within the TCP/IP Transport Agent.

When the client application issues an outbound TCP "connect" request to another system, or attempts to send a UDP datagram to another system over a socket bound to INADDR_ANY, the FEP Multihoming and Routing component utilizing a specific support function selects one FEP from a prioritized set of FEPs to carry out the requested operation and retries until it finds an FEP in the list through which it can reach the destination system. If the selection step results in no candidate FEPs, then the TCP/IP Transport Agent notifies the application of the failed call.

Because the present invention enables FEPs to be connected to different TCP/IP networks or subnets or to different portions of the same network or subnet, this provides path redundancy for maintaining operation in the event of a path component failure (e.g. I/O processor, channel, FEP, network connection). Additionally, this capability through proper configuration enables increased communication load capacity in cases where the communications load may be greater than a single FEP can reliably handle (i.e., the traffic can be spread over several FEPs).

The above objects and advantages of the present invention will be better understood from the following description when taken in conjunction with the accompanying drawings.

BRIEF DESCRIPTION OF THE DRAWINGS

FIGS. 3a through 3g illustrate different control structures utilized in conjunction with the FEP Multihoming and Routing component of the present invention.

FIGS. 4a through 4j are diagrams illustrating the specific functions utilized by the present invention.

DESCRIPTION OF THE PREFERRED EMBODIMENT

For ease of explanation, a glossary of some of the terms utilized within the following description has been included as an Appendix.

FIG. 1

Figure 1:
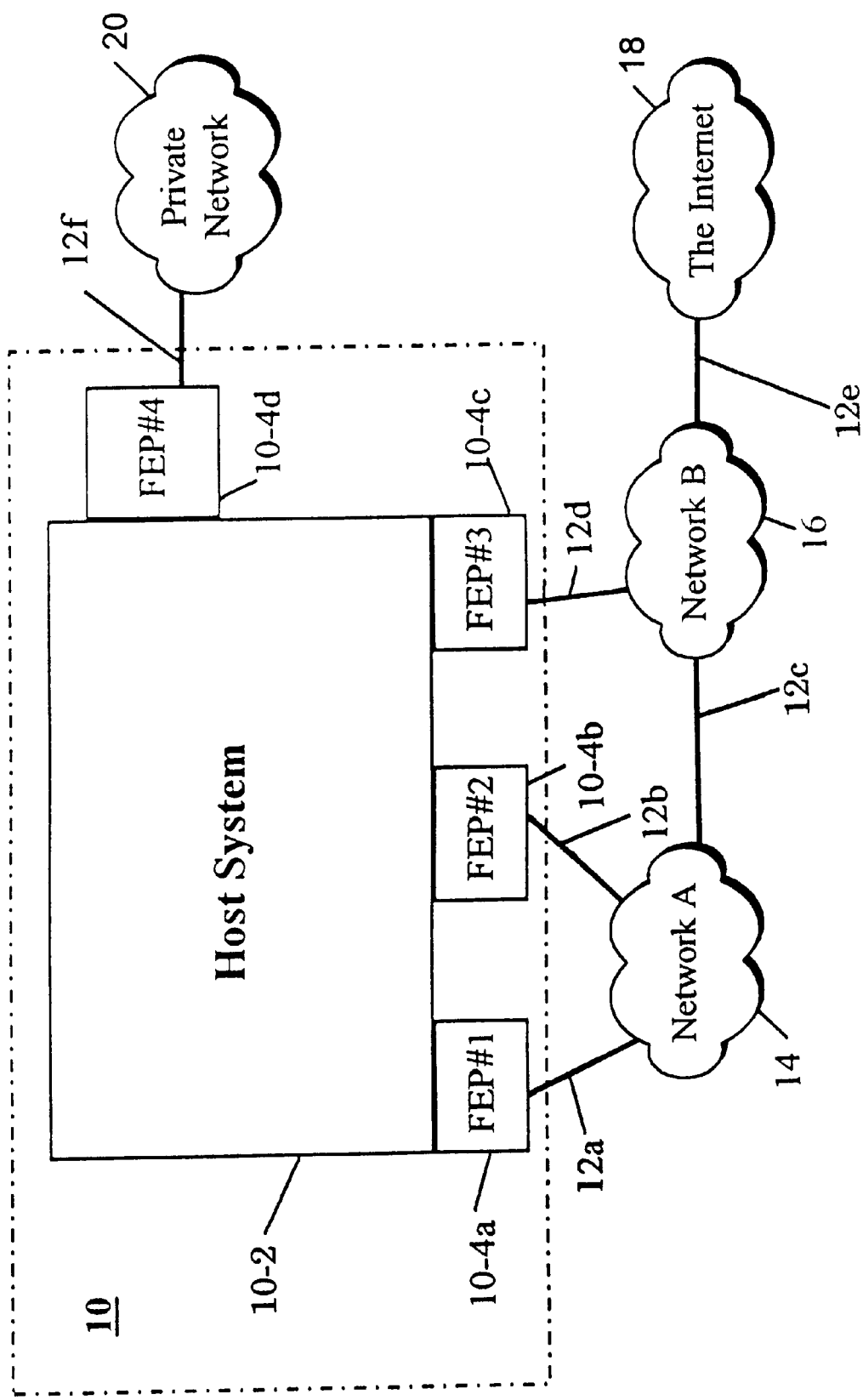
FIG. 1 is an overall block diagram of a system having a TCP/IP Transport Agent which includes the FEP Multihoming and Routing component of the present invention.

FIG. 1 is a block diagram of a conventional data processing system 10 which includes a host processor 10-2 connected to a plurality of front-end processors (FEPs) 10-4a through 10-4d which in turn provide network access as indicated. The connections between the host processor 10-2 and FEPs can be any channel connections supported by the host.

In the preferred embodiment, the host processor 10-2 is proprietary system such as the DPS9000 system manufactured by Bull HN Information Systems Inc. The host system 10-2 operates under the control of a proprietary operating system, such as the GCOS 8 operating system marketed by Bull HN Information Systems Inc. Each FEP can be an FCP 8, OPEN 8 or a DXE adapter, connected over standard I/O channels including the FIPS (Federal Information Processing Standard) channel. For further information regarding the types of FEPs, reference may be made to Sockets Administrator's Guide, Bull order number 67 A2 RG44.

It will be noted in FIG. 1 that the complement of four FEPs are configured in a number of different ways. By way of example, FEPs 10-4a and 10-4b are shown as both connecting via separate network connections 12a and 12b to the same Network A 14 which in turn connects to the Internet 18 via Network B through network connections 12c and 12e as indicated. The FEP 10-4c is shown as being connected to Network B 16 via network connection 12d. Lastly, FEP 10-4d connects to Private Network 20 via network connection 12f.

FIG. 2

Figure 2:
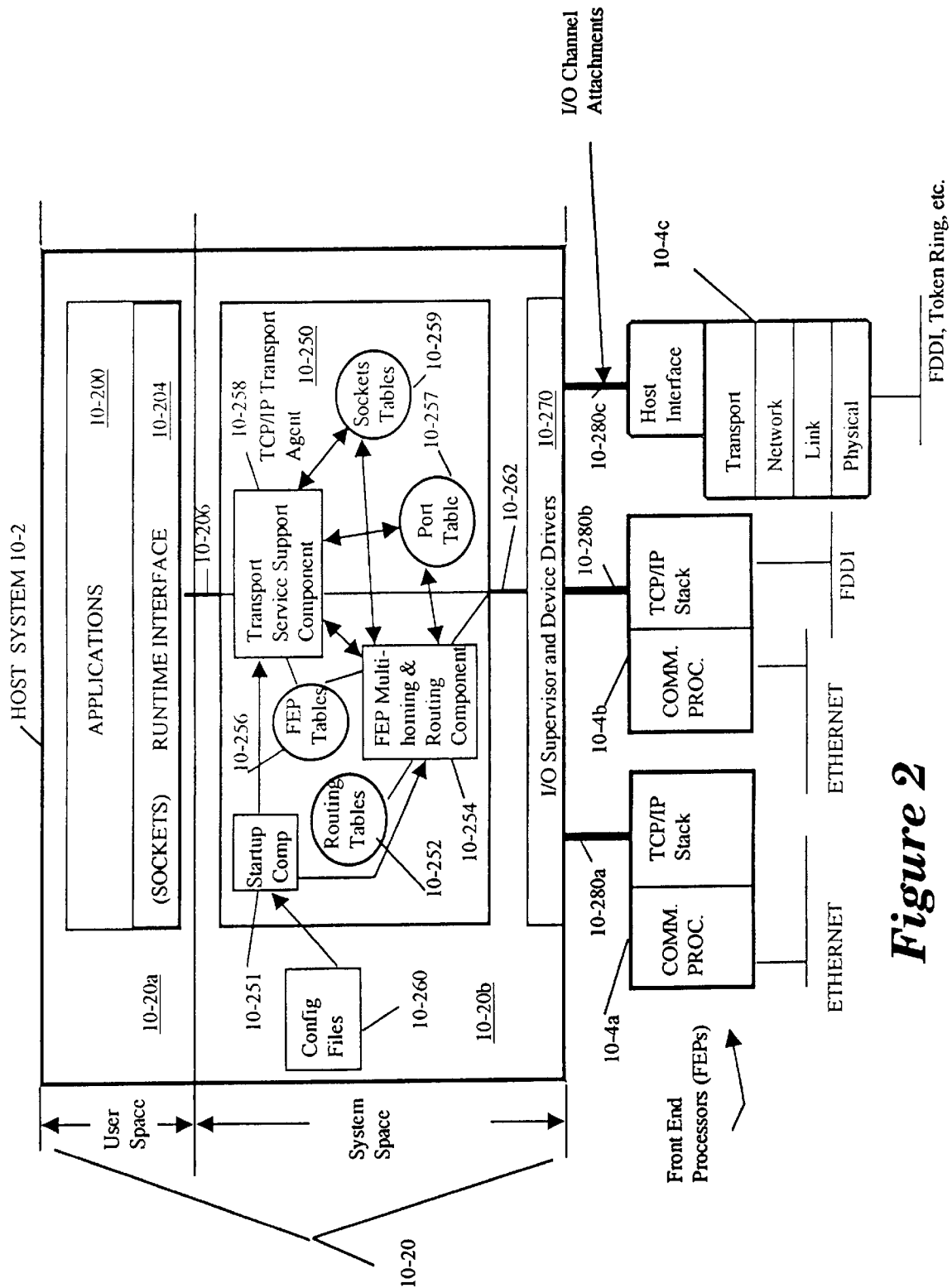
FIG. 2 illustrates in greater detail, the system of FIG. 1 which includes the FEP Multihoming and Routing component of the present invention.

FIG. 2 shows in greater detail, portions of the system 10 of FIG. 1 including the TCP/IP Transport Agent 10-250 which incorporates the FEP Multihoming and Routing component 10-254 of the present invention. As shown, host system 10-2 includes a memory area 10-20 which is divided up into a user space section 10-20a and a system space section 10-20b as indicated. The user space section 10-20a contains the applications 10-200 being run on the host system 10-2 and a runtime interface 10-204. The runtime interface 10-204 enables the use of existing APIs within the host system 10-2 and therefore, obviates the need to make changes to applications utilizing such services.

In the preferred embodiment, the runtime interface 10-204 supports the Sockets API. Hence, "Sockets" terminology will be used herein. It will be appreciated, however, that Sockets is only an API and not a protocol specification. For example, the XTI API may also be utilized. That is, runtime interface 10-204 is not in any way precluded from providing support of XTI or another transport API as a matter of design choice.

Application transport service requests to the TCP/IP Transport Agent 10-250 invoke routines contained within a Transport Service Support component 10-258 included therein as indicated in FIG. 2 to create transport endpoints on FEPs, to bind addresses and ports, to manage FEP and network information, to listen for incoming connections, to initiating connections to remove hosts, and to send, and receive data. The FEP Multihoming and Routing component 10-254 includes mechanisms/functions to select FEPs. Additionally, the TCP/IP Transport Agent 10-250 contains a number of memory data structures such as Routing Tables structure 10-252 and FEP Tables structure 10-256 for supporting multihoming and a startup component 10-251 for initializing such data structures as discussed herein.

In greater detail, as shown in FIG. 2, the system space section 10-20b contains the different components of the enhanced TCP/IP Transport Agent 10-250 of the present invention, a configuration files component 10-260 labeled Config. Files which operatively couples to the Agent 10-250 and a system I/O supervisor and device drivers component 10-270 which serves as the interface between the FEPS 10-4a through 10-4c and the TCP/IP Transport Agent 10-250. Additionally, as shown, the TCP/IP Transport Agent 10-250 further includes a Socket Table structure 10-259 and a port management table structure 10-257 used by Transport Service Support component 10-258 and FEP Multihoming and Routing component 10-254 for servicing requests as discussed herein.

Startup component 10-251 includes a set of routines executed when the operating system is initialized (i.e., booted) which serve to initialize/populate the contents of the Routing Tables structure 10-252 and the FEP Tables structure 10-256 by reading the appropriate files within Config Files component 10-260. Transport Service Support component 10-258 contains a state of the art set of transport agent service functions/routines which translate socket API calls into the transport provider protocols used to communicate with the FEPs through interface 10-262. This set of functions/routines has been augmented by a subset of functions of FIGS. 4i and 4j designed for enhancing operation through the use of FEP Multihoming and Routing component 10-254 as described herein.

The FEP Multihoming and Routing component 10-254 includes a set of support functions/routines of FIGS. 4a through 4j which are used in processing application requests as described herein. As discussed above, both the Routing Tables structure 10-252 and FEP Tables component 10-256 are configured by FEP information obtained from the Config Files component 10-260 as explained herein. Thus, the TCP/IP Agent 10-250 provides Route Tables and FEP Tables components 10-252 and 10-256 at the system level configured for enabling multihomed operation on host system 10-2.

As indicated in FIG. 2, the TCP/IP Transport Agent 10-250 communicates with component 10-270 via interface 10-262. The I/O Supervisor and Devices component 10-270 communicates with FEPs 10-4a through 10-4c via interfaces 10-280a through 10-280c.

FIG. 2 further illustrates the basic allocation of networking functions between the host system 10-2 and FEPs 10-4a through 10-4d. As indicated, the host system 10-2 provides the functions associated with the Application layer in addition to providing a common layer which supports all of the functions of each FEP while each FEP provides the I/O functions associated with the Transport, Network, Data Link and Physical layers. This organization is illustrated by FEP 10-4c which includes a host interface section for providing the FEP-specific Transport Provider Protocol, and TCP/IP stack layers.

Control Structures—FIGS. 3a–3g

Figure 3A:
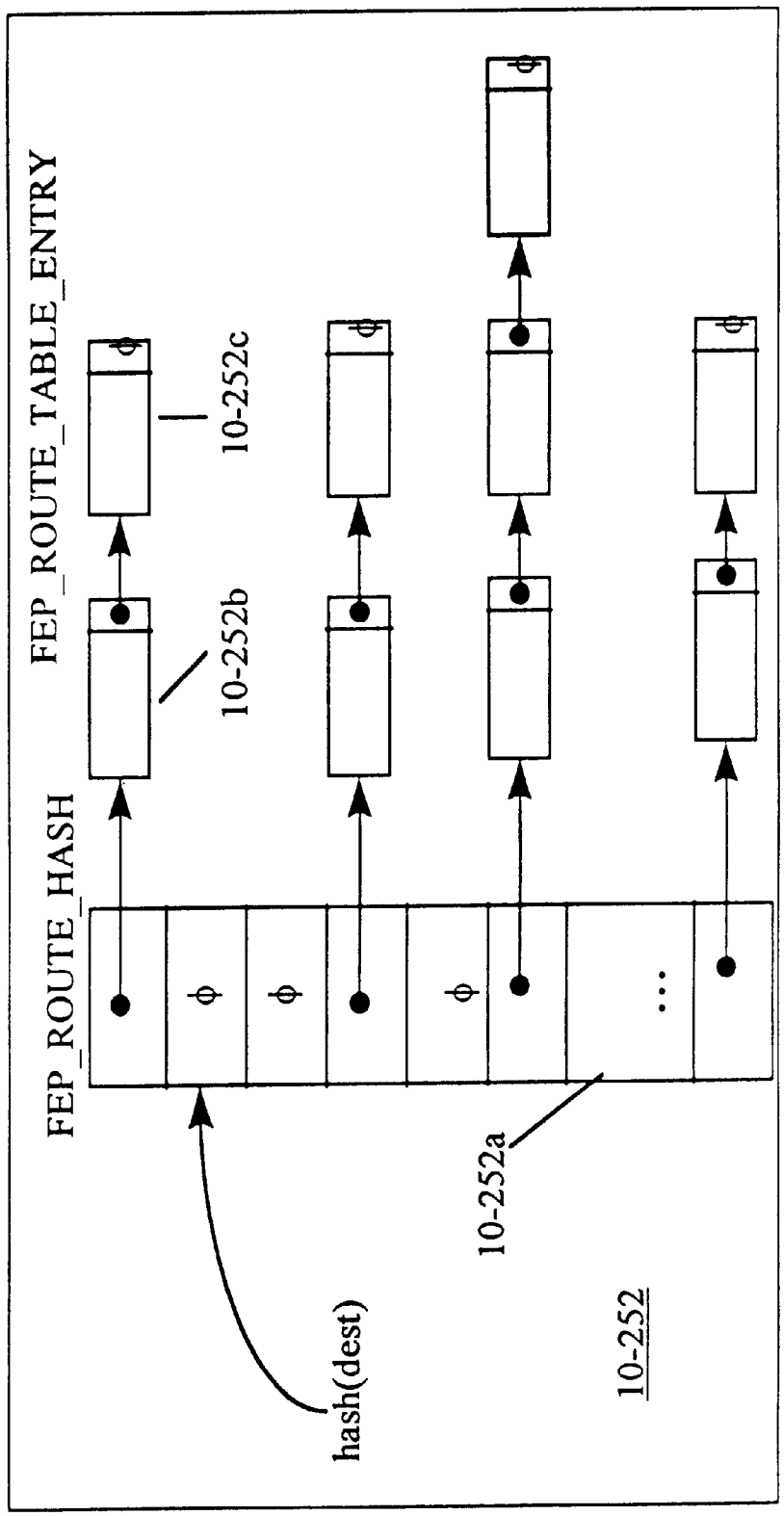

FIG. 3a shows in greater detail, the structure of the FEP table component 10-252. FEP table 10-252 is organized for fast access to the appropriate FEP entry in response to an input destination IP address. As shown, the FEP table 10-252 is represented as a set of route nodes 10-252b which are dynamically created and linked together from a fixed length hash table structure 10-252a labeled as FEP_ROUTE_HASH in FIG. 3a. The hash table structure 10-252a has a hash modulo value (i.e., size) of typically 512–1024.

The hash algorithm/function used to provide fast access is a standard algorithm such as the algorithm which is described at page 89 of the text entitled "Internetworking with TCP/IP, Vol II: Design, Implementation and Internals" by Douglas E. Comer, and David L. Stevens published by Prentice-Hall, copyright 1991, 1994. Briefly, the hash function for a given address is obtained by summing the individual portions (octets) of the network address portion of the destination IP address (1 byte for class A, 2 for class B, 3 for class C and 4 otherwise) and dividing the by the hash table size. The remainder is used as the index into the FEP_ROUTE_HASH hash table 10-252a. If no match is found, a special "default" destination (by convention, default destination address 0.0.0.0) is used.

As indicated in FIG. 3a, each node is represented by an entry structure 10-252c labeled FEP_ROUTE_TABLE_ENTRY shown in greater detail in FIG. 3b. From FIG. 3b, it is seen that each entry includes the following fields: a destination address field, dest_addr; a destination mask field, dest_mask; a next pointer field for use in traversing the hash table, next_pointer; a gateway field for the first hop gateway, gateway; a fepbit mask field which specifies which FEPs can be used for this route, fep_mask; a fep mask count field which contains the count of bits in fep_mask, fep_mask_count and a metric field which describes the cost of the route in gateway hops, metric. The actual destination to which the route is defined is expressed as a combination of dest_addr and dest_mask, where dest_mask describes which portion of dest_addr to use; default routes are maintained with FEP_ROUTE_MASK_ENTRY_values with a dest_addr of 0.0.0.0. The initial values for the hash table 10-252 entries are supplied from the configuration files 10-260 of FIG. 2 as described herein. As discussed herein, the entries are built by a function FEP_Route Table Add Route of component 10-254 which is shown in greater detail in FIG. 4b.

FIG. 3c illustrates in detail, a route mask structure 10-254-4 utilized by the FEP Multihoming and Routing component 10-254 of the TCP/IP Transport Agent 10-250 of FIG. 2 in selecting an FEP based on the destination IP address. The route mask structure 10-254-4 comprises a table containing up to 16 entries for storing a corresponding number of route mask entry values. As shown, the structure 10-254-4 is indexed by a metric field which records the cost (in hops, or routers through which each packet must pass) to get to the destination through this set of FEPs. Each route mask entry further includes a count field for storing a count of the FEPs in the mask and an fep mask field, FEP_mask for storing a bit mask of valid FEPs for the route mask entry. As discussed herein, these entries are built by a function Get_Route Mask of component 10-254 which is shown in greater detail in FIG. 4b. The entries are passed to another function Get_FEP_Index of component 10-254 of FIG. 4c as discussed herein.

FIG. 3d illustrates in greater detail, the structure of FEPs Tables component 10-256 of FIG. 2. As shown, the structure 10-256 is constructed as an array containing sets of locations having addresses 0 through num_FEPS-1. Each set of locations are used for storing pertinent information about a particular FEP interface available, such as "ifconfig" information used when establishing network interfaces with the FEP hardware interfaces to select and address a specific FEP in addition to storing current status information indicating whether the FEP is up or down (i.e., active or inactive). As shown, each set of array locations includes an IP address location, ipaddr, a net mask location, netmask, an FEP address information location, FEP addr info and an FEP status indicator location, FEP_is_up.

FIG. 3e illustrates the structure of a FEPNET table component included as part of structure 10-256. The FEPNET table is a static table built when the configuration files 10-260 are read by the startup component 10-251 of Transport Agent 10-250. The FEPNET table is a sparse array structure built with each row representing a unique local network or subnet to which one or more FEP interfaces connect (i.e., interfaces 10-280a–10-280c of FIG. 2). The unique local network or subnet is designated by the "subnet ip addr" and "netmask" values included within a column of the table array labeled "localnet". The columns across the array are filled in for each FEP interface present on the same network or subnet and a count of the interfaces is maintained in a field labeled "num_ent". As discussed herein, the FEPNET table is built by a function FEPNET Table Add Entry of component 10-254. This function is illustrated in greater detail in FIG. 4d.

When the FEPNET table is being traversed by the TCP/IP Transport Agent 10-250 (i.e., the FEP Multihoming and Routing component 10-254), the first row encountered which has a num_ent field equal to zero represents the end of the table. The table entry values denoted by the field "FEPx index" refer to the index into the FEP table 10-256 for locating a specific FEP. Each FEP interface index value appears once and only once in the FEPNET table.

Figure 3F:
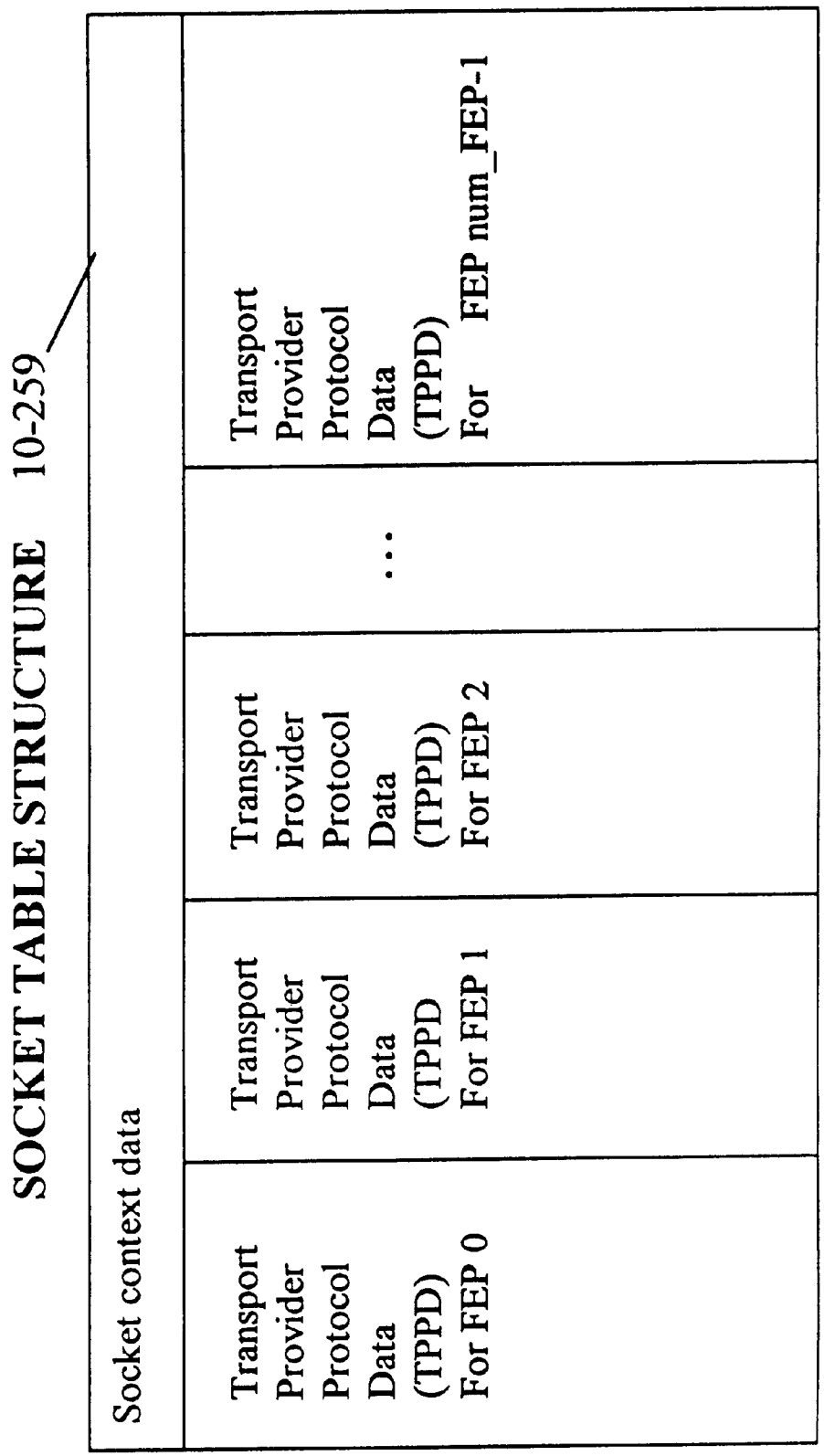

FIG. 3f illustrates in greater detail, the Socket Table structure 10-259 utilized by the TCP/IP Transport Agent 10-250 (i.e., Transport Service Support component 10-258 and FEP Multihoming and Routing component 10-254). Each of the applications which use "Sockets" to represent transport connections is allocated a Socket_Table structure by component 10-258 within the TCP/IP Transport Agent structure 10-259. The Socket_Table structure is an array indexed by the socket number assigned to the particular application. Socket Table entries are allocated when the "socket" is called using an unused entry array location. Several pieces of context data are maintained in the Socket_Table Entry location, in particular, the set of transport endpoints on the various FEPs which exist to support this Socket.

In the previously discussed prior art system, a Socket or in more general terms, a transport connection table entry for an individual transport connection included a field describing the link to the particular FEP used which is specific to the Transport Provider protocol. In the case of the multihomed implementation of the present invention, the Socket Table entry contains an array or linked list which can have an entry for each FEP, again specific to its transport provider protocol. This structure is illustrated in FIG. 3f. As discussed herein, the set of entries in the Socket_Table structure are filled in by the Transport Service Support component 10-258 in response to a "multibind" request.

Figure 3G:
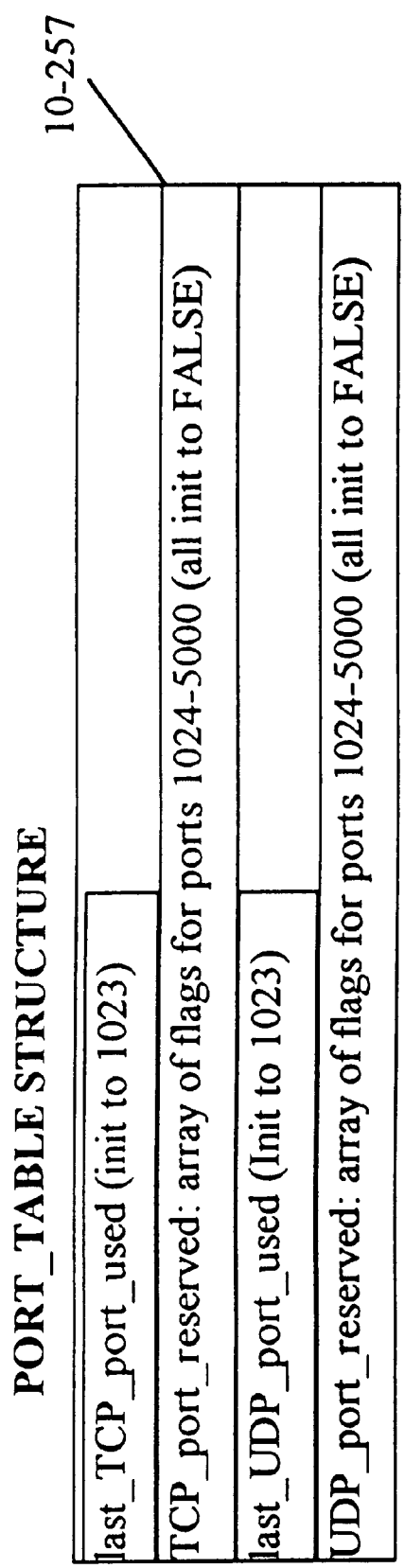

FIG. 3g illustrates in greater detail, the port management data structure 10-257 utilized by the Transport Service Support component 10-258 and the FEP Multihoming and Routing component 10-254 for carrying out port assignment operations. The structure 10-257 is an array or table indexed by the port number portion of the socket number value assigned to the particular application. Port table entries are allocated by the Assign_port, Reserve_port and Free_port functions of component 10-254. These functions/routines are shown in greater detail in FIGS. 4f through 4h.

As indicated in FIG. 3g, there are several types of port entry information maintained in structure 10-257. This includes entries for designating the last TCP port used by an application (i.e., stored in last_TCP_port_used), the TCP port reserved (i.e., stored in TCP_port_reserved), the last UDP port used by an application (i.e., stored in last_UDP_port_used) and the UDP port reserved (i.e., stored in UDP_port_reserved). Both the last TCP port used and last UDP port used fields are each initialized to the value "1023". The TCP port reserved and UDP port reserved are each an array of flags for ports 1024 through 5000 (the conventional range used for such arbitrary port assignments) which are all initialized to a "FALSE" state. As described herein, the entries in the Port_table structure 10-257 are initially filled in by the Transport Service Support component 10-259 in response to a "multi_bind" request.

DESCRIPTION OF OPERATION

With reference to FIGS. 1 through 3f, the operation of the TCP/IP Transport Agent's FEP Multihoming and Routing component 10-250 of the present invention will now be described relative to FIGS. 4a through 4j and FIG. 5.

Initially, the system administrator via a TCP/IP administration constructs a file (i.e., block 10-260) containing pertinent information about the set of configured FEPs which is read by startup component 10-251 at system initialization. This information includes: (1) IP address wherein if an FEP has more than one IP address, it is considered a separate FEP; (2) Subnet mask value; and (3) FEP specific information about how to access the FEP communication services.

A system administrator is limited as to the number of FEPs which can be configured. In the present embodiment, there are assumed to be 16 or 32 FEPs (typically based on the number of bits in a machine word). In the present embodiment, since FEPs can only be configured statistically, not be added dynamically, a system restart is required for adding a FEP to the initial configuration.

The following is an example of a command/directive used to configure an FEP based interface having a syntax which is supported in common UNIX based implementations:

ifconfig sy14.fd0 inet 129.182.18.15 netmask 255.255.255.0

In this example, the term "sy14.fd0" identifies an interface on a specified FEP. The term "inet" specifies the TCP/IP protocol to be used while the value "129.182.18.15" is the IP address of the interface being defined. The term "netmask 255.255.255.0" specifies what portion of the IP address describes the subnet portion which in this case corresponds to the value "129.182.18.0" while the host portion corresponds to the value "15".

In a standard manner, the "ifconfig" information defined above can be sent to the FEP to configure its TCP/IP interfaces. More importantly, the present invention makes use of the same "ifconfig" information to populate those memory data structures (i.e., Routing Tables 10-252, FEP Tables 10-256) which are necessary for implementing the host multihoming capability of the present invention.

In addition to setting up a file for configuring the set of FEPs, the system administrator also sets up the initial static routes in a file (i.e., "route list") which is to be read by startup component 10-251 during system initialization. The same setup procedure is followed when updating routes by the FEP Route_Table Add Route function of component 10-254 of FIG. 4a.

Each routing request includes the following information: (1) the destination address (host or network) with "default" allowed to specify the route to use if no specific routes are appropriate; (2) the IP address of the gateway (also known as "router") to use to get to the configured destination; and (3) a "metric" value which equals the "hops" (i.e., routers or gateways to pass through) to get to the configured destination. As to the number of configured routes, there is no fixed maximum except the amount of memory available to allocate all configured routes.

It will be appreciated that "dynamic routing" also may be utilized in conjunction with the present invention. In this type of routing, routing daemons are used to update the routing table. Such dynamic route information may be available via the RIP protocol, but such information is the same. In contrast to static routes, dynamic routes have the limitations of having a fixed time to live and being deleted if they are not refreshed. As indicated above, dynamic routing is not required for the operation of the present invention. The appropriate routes may be added by the system administrator as discussed above when FEPs are added followed by a system restart.

The following is an example of directives/commands to add routes having a syntax which is also supported in standard UNIX implementations:

| | | |
|---|---|---|
| route add 129.182.30.6 | 129.182.18.250 | 5 |
| route add default | 129.182.17.255 | 1 |

In this example, the "add" says to add a route. The system administrators can also "delete" existing routes by specifying "delete". The first set of numbers corresponding to a first address, 129.182.30.6, is the destination, which can be a host or network. The next set of numbers corresponding to a second address, 129.182.18.250, is the address of the gateway (a synonymous term here is "router") to use to get to the destination. This route directive applies only to FEPs on the same network segment as the specified gateway. The last number, 5, is the cost of the route, measured in number of "hops", or gateways traversed. This value is between 1 and 15. The second route "add" command is used for specifying the default route if the no specific route to the destination is defined.

As in the case of the "ifconfig" information, the "route" information is also sent in a standard manner by Transport Service Support component 10-258 to the FEPs to configure their TCP/IP interfaces. That is, each route directive is sent to each FEP whose IP address bits when ANDed with its subnet mask matches the route's gateway address bits ANDed with the same subnet mask. According to the present invention, the same "route" information is kept within the Routing Tables structure 10-252 on the host system 10-2 to configure the TCP/IP Transport Agent 10-250. It will be noted that although the route configuration information is in the same form as is used to configure the TCP/IP stacks on the various FEPs, the host system components usage of it is quite different and provides one of the key features of the present invention as discussed herein.

The system provides portions of the "ifconfig" information and route information to the FEP tables component 10-256 and the Routing tables component 10-252 as "fep data" and "route data" respectively for the purpose of configuring the Transport Agent 10-250. That is, relative to FIGS. 3a through 3d, the appropriate IP address, submask, etc. information obtained from the "ifconfig" information is entered into the FEP_TABLE structure 10-256 while the destination IP address, gateway, etc. information obtained from the route add commands is entered into the FEP_ROUTE_TABLE structure 10-252.

In greater detail, the TCP/IP Transport Agent 10-250 (i.e., Transport Service Support component 10-258) invoked by startup component 10-251 creates entries in the FEP_TABLE structure 10-256 of FIG. 3d based on processing the "ifconfig" directives at system startup time. After each entry is created in FEP_TABLE structure 10-252, the system (i.e., Transport Service Support component 10-258) calls the FEP Multihoming and Routing component's function "Add FEPNET_Entry" of FIG. 4d which adds the appropriate entry to FEPNET table 10-256 of FIG. 3e.

Briefly, the "Add FEPNET_Entry" function adds an entry to the appropriate one of the columns of the array structure 10-252 for the particular FEP interface. The function determines if this is the first time that the particular subnet is being specified by an "ifconfig" directive. If it is, the "Add FEPNET_Entry" function of component 10-254 allocates a row in the array representing that subnet. The function then enters the index value of the specific FEP into the first column of the row, sets the localnet subnet ip addr value equal to the result of ANDing of the FEP IP address bits and subnet mask bits and sets the localnet netmask value equal to the FEP subnet mask. Also, the function increments the localnet num_ent value by one.

As indicated in FIG. 4d, the "Add FEPNET_Entry" function of component 10-254 determines if the particular subnet is already present in the FEPNET structure of FIG. 3e by ascertaining that the FEPNET index specifies a subnet IP address which equals the result of ANDing the FEP IP address bits with the subnet mask and the FEPNET netmask equals the FEP subnet mask. If the subnet is determined to be already present, then the "Add_FEPNET_Entry" function enters the FEP index value into the appropriate column and increments the localnet num_ent value by one.

After all of the entries have been stored in the FEP_TABLE and FEPNET structures of FIGS. 3d and 3e respectively, the TCP/IP Transport Agent's startup component 10-251 invokes the FEP Multihoming and Routing component 10-254 which then reads the "routes" file to build the FEP_ROUTE_TABLE structure of FIG. 3a. As indicated above, the table's initial values are supplied by the basic configuration files file of block 10-260 previously constructed by the system administrator using "add route" commands. In response to each command, the system (i.e., startup component 10-251) calls the FEP Multihoming and Routing component's add_route function of FIG. 4b. This function creates a node in the FEP_Route Hash table 10-252a by allocating a new pointer value equal to the new FEP_ROUTE_TABLE_ENTRY value formatted as the structure 10-252b of FIG. 3b. As indicated in FIG. 4b, the Add_Route function of component 10-254 of FIG. 4a verifies the count of FEPs in the fep_mask_count field and the validity of FEPs in the fep_mask field and then establishes a link to hash table structure 10-252.

Later, when applications attempt to connect to another system or send UDP data, the Get_Route_Mask function of FIG. 4b builds the Route_Mask structure 10-254-4 in accordance with the information contained in the FEP_Route_Table_entry structure of FIG. 3b.

After the above component structures have been populated/built with entries based on the "ifconfig" and route information, the TCP/IP Transport Agent 10-250 is now configured for multihoming. At this point, the system is ready for processing service requests from the various types of applications being run on host system 10-2.

Figure 5:
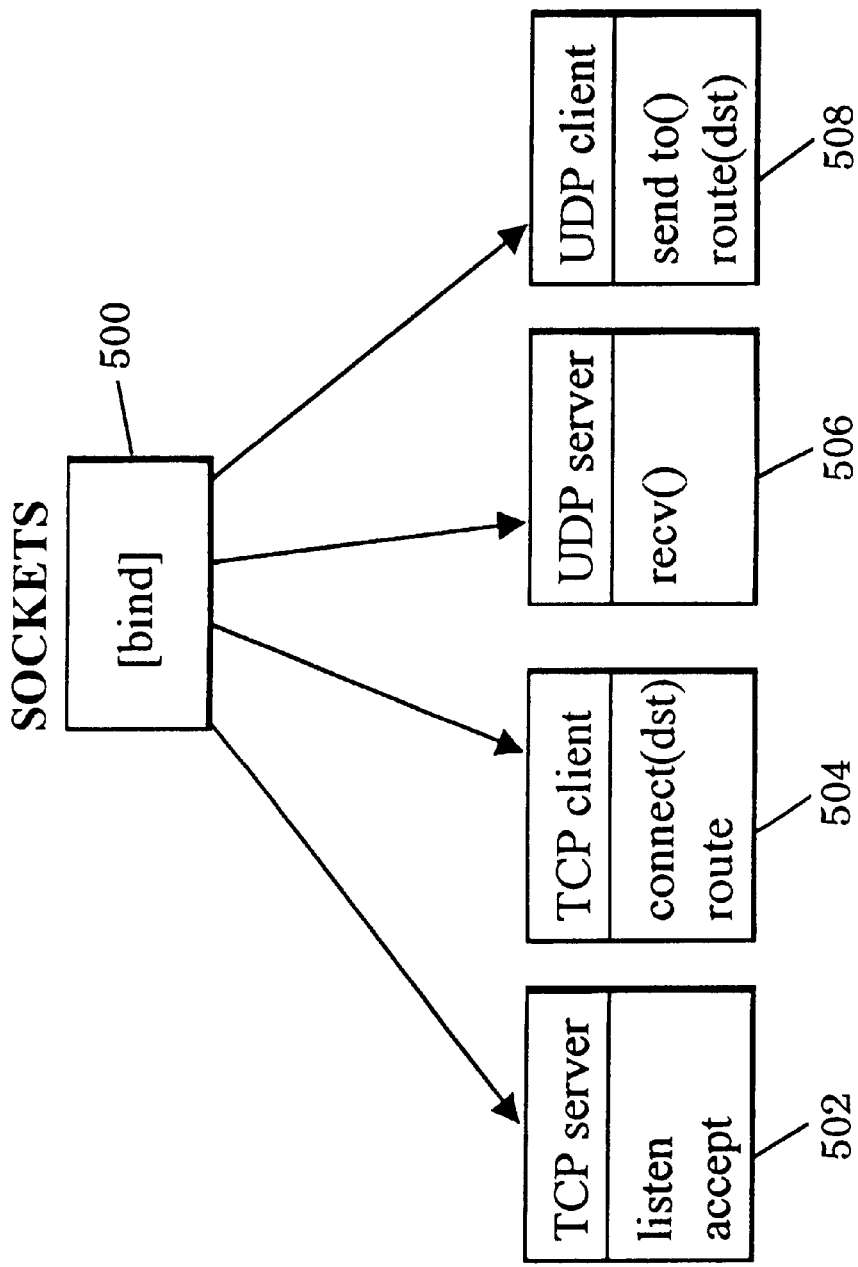
FIG. 5 is a sockets protocol flow diagram used in describing the operation of the TCP/IP Transport Agent as augmented by the FEP Multihoming and Routing component of the present invention.

FIG. 5 indicates various types of applications and their associated functions which require special processing by TCP/IP Transport Agent 10-250 when "multihoming" over multiple FEPs.

When using a Transport API like Sockets, the following types of basic functions are normally supported by runtime interface 10-204 and Transport Service Support component 10-258: (1) create a new transport handle (socket) (whether to use TCP or UDP is specified here); (2) bind—to bind the transport handle to a specific local interface or to all local interfaces (can be skipped and will be done implicitly); (3) connect—to connect via TCP to a remote endpoint; (4) listen—to enable a TCP socket to listen for incoming connections; (5) accept—to create a new (i.e., child) TCP socket for an incoming connection; (6) read/recv—to read from a connected socket; (7) recvfrom—to read from a UDP socket; (8) write/send—to write to a connected socket; (9) sendto—to write to a UDP socket (to a specified remote endpoint); and (10) close—to destroy a socket.

The TCP/IP Transport Agent 10-250 (i.e. Transport Service Support component 10-258) provides special handling for functions (2) through (5) and (9) when multihoming over multiple FEPs in the following manner. Referring to FIG. 5, it is seen that the Transport Agent 10-250 provides TCP server support as indicated by block 502, UDP server support as indicated by block 506 and TCP and UDP client support as indicated by blocks 504 and 508, respectively. In the case of server style application support, the application will "bind" to a specific UDP or TCP port which is well-known to clients and servers ("well-known ports") like FTP or which is registered with a known directory service so clients can request it by name. The TCP/IP Transport Agent 10-250 (i.e., Transport Service Support component 10-258) must obtain this port on each FEP, if possible, by calling the "multi_bind" function of component 10-254 of FIG. 4e. This function will attempt to bind to the specified port on each configured FEP by invoking the Assign_port, Reserve_port and Free_port functions of FIGS. 4f through 4g as appropriate. These functions in turn operate to update the contents of the Port_table structure 10-257 of FIG. 3g to reflect the port assignment. When one of the FEPs successfully binds the port on at least one FEP, the application can continue making requests. The TCP/IP Transport Agent 10-250 (i.e., Transport Service Support component 10-258) marks as restartable, those FEPs for which the bind request fails and will periodically retry the bind requests until the FEP becomes available again. That is, the FEPs which were unavailable at the time of the bind request ("down FEPs"), fails and will have their requests queued.

It will be noted that requests for FEP service are typically asynchronous in that a request is sent and a response comes back some time later. The set of FEP transport endpoints is reflected by Transport Service Support component 10-258 in the Socket table entry structure of FIG. 3f.

As indicated in FIG. 5, the next request in the sequence of application requests/calls is a listen request which puts the Socket in a listening mode. The TCP/IP Transport Agent 10-250 (i.e., Transport Service Support component 10-258) sends the listen request to all FEPs participating in (bound to) the socket. Again, any unavailable FEP at the time of the listen request, will have its request deferred.

When a correspondent network host system initiates an incoming TCP connection (accept call) through one of the FEPs listening for an incoming connection, the application can proceed using the newly established TCP connection. In the case of the Sockets API, the original Socket remains in a listening mode on configured FEPs. However, the Sockets API in response to the accept call creates a new "child" socket which is bound to the specific FEP through which the connection came. The TCP/IP Transport Agent 10-250 does not have to provide multihoming support for this new socket.

In the case of UDP application support, it will be noted that the UDP protocol is a "connectionless" protocol. Once a socket is bound, it can send data to any IP address and receive data from any IP address. When a socket is bound to INADDR_ANY, the TCP/IP Transport Agent 10-250 (i.e., Transport Service Support component 10-258) must provide the ability to send and receive using any FEP. This is accomplished by having component 10-258 in response to the bind request specifying a socket bound to INADDR_ANY making a call to the "multi_bind" function of component 10-254 of FIG. 4e which creates a UDP transport endpoint on each FEP, which can then listen for datagrams on the specified port as designated in Port_table structure 10-257. This is accomplished by invoking the functions of FIGS. 4f through 4g.

In the case of the "sendto" function of block 508, the TCP/IP Transport Agent 10-250 (i.e., Transport Service Support component 10-258) routes the requests via one of the FEPs based on the destination address utilizing the enhanced UDP_Sendto function of FIG. 4j. This function operates in the manner described hereinbelow relative to client application support.

In the case of client style applications, typically, such applications let their UDP or TCP port to be arbitrarily assigned. Here, the TCP/IP Transport Agent 10-250 (i.e., Transport Services Support component 10-258) must obtain the same "arbitrary" port on each FEP. The TCP/IP Transport Agent 10-250 (i.e., Transport Services Support component 10-258) accomplishes this by calling the "multi_bind" function of component 10-254 of FIG. 4c with a port value of 0 in response to each bind request. The "multi_bind" function in turn invokes the functions of FIGS. 4f through 4h as appropriate which in turn make the appropriate entry changes to the Port_table structure 10-257.

When the application issues an outbound TCP "connect" request to a correspondent host system, or attempts to send a UDP datagram to a correspondent host system over a socket bound to INADDR_ANY, the TCP/IP Transport Agent 10-250 must select one FEP. To select an FEP, the TCP/IP Transport Agent 10-250 via Transport Services Support component 10-258 makes a call to the enhanced TCP_Connect function of FIG. 4f. As indicated in FIG. 4i, the function causes the TCP/IP Transport Agent's FEP Multihoming and Routing component 10-254 to first obtain a ROUTE_MASK entry from the structure of FIG. 3c based on the destination IP addresses which are candidates. The TCP/IP Transport Agent 10-250 (i.e., Transport Services Support component 10-258 TCP_Connect function) does this by calling the FEP Multihoming and Routing component's Get_Route_Mask function of FIG. 4b. The Get_Route_Mask function begins by using a hash function to get to the set of routes associated with the destination IP address contained in the FEP_Route_Table structure 10-252 of FIG. 3a. For each configured route (if any), the set of FEPs with a given metric are added to the set of candidate FEPs at that same metric level. Configured routes are defined to be those whose IP host or network address match those of the destination IP address. If a route is found by the Get_Route_Mask function, the Route_Mask is then used. Otherwise, the Get_Route_Mask function performs the same process using the conventional default destination value "0.0.0.0" to find default routes.

The get_route_mask entry structure returned by the function of FIG. 4b is then stored or cached in the application's SOCKET_TABLE_ENTRY location of the structure 10-259 of FIG. 3f along with the destination address. Next, to obtain the index of the FEP to use, the TCP/IP Transport Agent 10-250 enhanced TCP_Connect function of FIG. 4i makes a call to the FEP Multihoming and Routing component's Get_FEP_Index function of FIG. 4c passing as a parameter, the ROUTE_MASK entry value previously obtained by the Get_Route_Mask function.

The TCP/IP Transport Agent 10-250 (i.e., Transport Services Support component 10-258) can make this call iteratively after TCP connections failures other than a "connection refused". The called FEP selection function Get_FEP_Index of FIG. 4c carries out FEP selection utilizing random numbers. More specifically, as indicated in FIG. 4c, the Get_FEP_Index function uses a random number in the range of 0 of up to the value of routemask count minus 1. The use of a pseudo random number has been deemed reasonable in making certain that all outbound connections and datagrams do not go through the same FEP.

On each such call in which the connection fails, the Get_FEP_Index function of FIG. 4c progressively deletes bits (i.e., sets bits to zero) from the FEP_mask field in the ROUTE_MASK structure which represent the FEPs. When no further candidate FEPs can be found (all FEP_mask field bits equal zero), the Get_FEP_Index function returns a special value FAILURE. This causes the TCP/IP Transport Agent 10-250 (i.e., Transport Services Support component 10-258) to report such failure to the requesting application.

As indicated in FIG. 4i, the FEP index value obtained by the Get FEP Index function is returned to the transport services support component 10-258 which is then used to access the FEP table structure 10-256 to obtain the required information (i.e., FEP addr info) for communicating the connect request to the selected FEP via supervisor and device driver component 10-270. Once the TCP/IP Transport Agent 10-250 succeeds in making a TCP connection through an FEP, the bindings created for that socket on the other FEPs are closed and the socket is no longer "multi-homed".

Basically the same process is followed for a UDP sendto function (see FIG. 4j). Processing is simplified here because failures in sending data are not typically seen by the host unless an FEP has failed; UDP services are inherently unreliable.

From the above, it is seen how a typical transport agent can be enhanced to provide full multihoming support with the addition of a FEP Multihoming and Routing component. While the functions added to enhance the agent were included in a single component (i.e., FEP Multihoming and Routing component) in the preferred embodiment, it will be appreciated that such functions could have been integrated within other agent components. Also, for ease of explanation, the details relating to FEP configuration were omitted. It will be appreciated that for the purposes of the present invention, it is assumed that such configuration is carried out in a conventional manner.

Other changes may be made to the preferred embodiment without departing from the teachings of the present invention. For example, as discussed above, the invention may be adapted for use with other runtime interfaces and protocols.

APPENDIX

GLOSSARY

API—Application Programmatic or Programming Interface.

Application Layer The layer concerned with providing services to network users at an application-based level. The tasks performed on the application layer include login procedures, electronic mail, etc.

bind—Transport operation in which a local address is selected.

datagram—A block of data sent as a unit in connectionless transport services (e.g. UDP).

DXE—An FEP produced by Network Systems Corporation (now part of Storage Technology Corporation).

endpoint—(1) Transport endpoint is a handle used to represent a capability to communicate (also known as a "Socket"); (2) application or system in a network capable of communicating; (3) the local communication channel between a transport user (i.e. the user level application or protocol that accesses the services of the Transport interface) and a transport provider.

FEP—Front-end processor; providing communication protocol processing for a general purpose computer (host computer) which sees the FEP as a peripheral device.

FTP—Internet-standard File Transfer Protocol, built on top of TCP/IP.

gateway—A device which transfers data from one network to another, possibly performing protocol conversion. In TCP/IP networks, the terms "gateway" and "router" are often assumed to be synonymous.

hashing—An indexing technique in which the value of a "key" or address identifier is numerically manipulated to directly calculate either the location of the associated record/entry in a file or table or the starting point for a search for the associated record/file. If the key or identifier is a character string, each possible character is assigned a numeric code to permit the numerical manipulation. The manipulation performed on the key value is known as the hashing function.

INADDR_ANY—Special IP address in Sockets which indicates that the application wants to bind to any and all local IP addresses. That is, the socket interface defines a special constant INADDR_ANY in place of an IP address. INADDR_ANY specifies a wild card address that matches any of the host's IP addresses. Using INADDR_ANY makes it possible to have a single server on a multihomed host system accept incoming communication addressed to any of the host's IP addresses. To summarize when specifying a local end point for a socket, servers use INADDR_ANY instead of a specific IP address to allow the socket to receive datagrams sent to any of the host system's IP addresses.

IP Address Address of a node in a TCP/IP Network. Each IP address consists of three parts, the type of address (class A, B, or C), the "network part"(netid), and the "host part"(hostid). The width of the network and host parts is defined by the class of address. Network addresses are typically assigned to companies or organizations, which assign the host addresses which can be subdivided in any way desired to provide subnetworks. The host address field is typically subdivided into the "subnet part" and the "host part." Subnets generally occupy a LAN segment, and are defined by a 32 bit "subnet mask" which has 1-bits for the network and subnet parts of the address, and 0-bits for the host part.

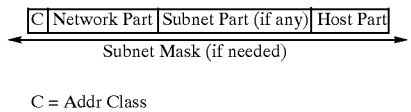

C = Addr Class metric In routing, the cost of a route, measured in the number or routers a packet must pass through (known as number of "hops"). For TCP/IP networks, a metric value can be between 0 and 15.

multihoming—The ability for a host on a TCP/IP network to be connected to more than one network, or to have more than one physical connection to a network. A multihomed host must have two or more Internet addresses, one for each network to which it connects. Thus, every Internet address specifies a unique host, but each host does not have a unique address.

Network interface The hardware and driver software that connects a host to a physical network.

Octet An eight bit byte.

port TCP/IP addressing construct, represented as a 16-bit integer, which identifies an individual application on a given IP address (or set of IP addresses). The port is used by the host to host protocol to identify the higher level protocol or application program (process) to which it must deliver incoming messages. Also, a port is the portion of a socket that specifies which logical input or output channel of a process is associated with the data.

RIP—Routing Information Protocol, a broadcast UDP-based protocol in which Routers (gateways) advertise destinations they can reach with a given HOP count. The gateways periodically broadcast their current routing table contents to neighbor systems. The broadcast message lists each destination along with a distance measured in gateway hops. The RIP hop count is reported relative to the sender's active routing table and new routes are computed by a routed daemon based on hop count.

router—A device which routes traffic between LAN segments (generally seen as "networks" or "subnets" in TCP/IP networks). Dynamic or adaptive, routing is the ability to transfer data automatically to the destination node via alternative paths consisting of one or more intermediate nodes. Routing includes the ability to ascertain available paths and to decide the best path taking into account topology changes or node failures as they occur.

socket—A transport fd used as part of the Socket API. It is the pair of numbers which uniquely identifies each application (Socket=IP address, port number).

Sockets—Transport-level API originally developed as part of the Berkeley Software Distribution (BSD) version of the UNIX operating system. Now available on other systems, especially those supporting TCP/IP as a networking protocol; a library of functions that provide an interface for interprocess communication across a network or between processes.

stack—A set of software services which implement data communication protocols; the term refers to the set of protocols and interfaces defined as part of the 7-layer OSI model, which stack on top of each other.

subnetting—A method that makes it possible to divide a single network into multiple logical networks (subnets). With "subnetting", one address may be given to the internet and internally, the packets are distributed to the correct network.

subnet mask—A subnet mask is used for defining which bits of the host address part of the IP address will be subnetted to be used as part of the network address part. The subnet mask is typically 32 bits and a bit value of 1 indicates that bit position is part of the network address portion of the IP address.

TCP—Transmission Control Protocol is a transport level connection-oriented protocol that provides reliable end-to-end message transmission over an internetwork.

TCP/IP—A well known collection of protocols for network communications.

Transport—A layer of the 7 Layer OSI model. Located between the "Session" and "Network" layers; a common access point for UNIX based applications, especially those based on Sockets, XTI, or TLI.

transport fd—A general term used to describe a transport endpoint; includes sockets and fds used for XTI.

Transport provider The transport protocol that provides the services of the transport interface.

UDP User Datagram Protocol is an unreliable user level transport protocol for transaction oriented applications. It handles datagram sockets and uses the IP layer for network services.

XTI—The X/Open Transport Interface, based on TLI. Logically equivalent interface to Sockets, but designed to facilitate better networking protocol independence.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

We claim:

1. A transport agent for providing full multihoming support in processing network communication service requests from a number of application processes being run on a host system connected to communicate with a number of networks and subnetworks connected to an internetwork which connects to a number of destination host systems, the host system including a plurality of front end processors (FEPs), each FEP having a network protocol stack and being connected to either a different one of the networks or subnetworks or to a different portion of the same network or subnetwork so as to process communications network requests between the host system and the other host systems, the host system further including host operating system software having an application runtime interface and input/output supervisor and driver facilities, the transport agent being located between the runtime interface and supervisor and driver facilities and including a transport service support component operatively coupled to the runtime interface and to the input/output supervisor and driver facilities for servicing the communications network requests including establishing communications between application processes and processes running on the other host systems, the transport agent further comprising:

(a) a multihoming and routing component operatively coupled to the transport service support component and to the FEPs;

(b) a plurality of table structures operatively coupled to the multihoming and routing component, a first one of the table structures containing a plurality of locations initially configured to store static route information defining available connection paths to the destination host systems and a second one of the table structures containing a plurality of locations for storing entries indicating the FEPs of the plurality of FEPs configured in the host system; and (c) the transport service support component including functions for invoking the multihoming and routing component in response to each predetermined type of request specifying that an application process wants to bind to any and all local host network addresses, the multihoming and routing component when invoked being operative to attempt to bind each configured FEP to the application process in accordance with the entries stored in the first and second tables, the multihoming and routing component upon successfully binding to one of the configured FEPs signaling the application process that binding has been completed while continuing to bind remaining configured FEPs to the application process so as to maintain path redundancy and increased load capacity during communications with destination host systems.

2. The transport agent of claim 1 wherein the runtime interface utilizes sockets and the predetermined type of request includes a special constant INADDR_ANY for enabling the application process to receive information sent to any of the host system's EP addresses.

3. The transport agent of claim 1 wherein the first table structure defines a number of routing tables and the second table structure defines a number of FEPs tables.

4. The transport agent of claim 3 wherein the host system further includes a configuration file for storing pertinent information files defining configured FEPs and initial static routes, the transport agent further including a startup component operatively coupled to the transport service support component and to the multihoming and routing component, the startup component being operative during host system initialization to read the contents of the files and invoke the transport service support component and the multihoming and routing component for building entries in the FEPs tables and routing tables in accordance with the contents of the pertinent information files.

5. The transport agent of claim 3 wherein the pertinent information files include a plurality of administratively entered ifconfig directives and the transport service support component upon being invoked by the startup component is operative to create the entries in the FEP tables based on processing the ifconfig directives pertaining to FEP interfaces.

6. The transport agent of claim 5 wherein the transport service support component in response to the startup component, operates to invoke the multihoming and routing component after creating entries in the FEP tables causing the multihoming and routing component to add predetermined entries in a portion of the FEP tables for specifying multihoming FEP interface connections.

7. The transport agent of claim 6 wherein the portion of the FEP tables defines a FEPNET table comprising an array structure having a plurality of rows and columns, each row allocated to represent a different subnetwork and the columns of each row for storing information defining the different multihoming FEP interfaces associated with the different subnetwork entered by the multihoming and routing component.

8. The transport agent of claim 7 wherein the multihoming and routing component includes an Add FEPNET entry function, the Add FEPNET function when invoked determines if that the subnetwork is being specified a first time by an ifconfig directive, upon determining that the subnetwork is specified a first time the Add FEPNET function allocates a next unused row of the array defined by an FEP index value to the subnetnetwork and then adds an entry to a first column of the next row for the particular FEP interface.

9. The transport agent of claim 8 wherein the Add FEPNET function upon determining that the subnetwork has been previously specified by an ifconfig directive operates to add an entry for the particular FEP interface to an appropriate one of the columns of the row allocated to the subnetwork.

10. The transport agent of claim 8 wherein the Add FEPNET function determines if the subnetwork is present in the FEPNET table by ascertaining that the FEP index value specifies a subnet IP address which equals a result of anding the FEP ip address bits with the subnet mask and that the FEPNET netmask equals the FEP subnet mask.

11. The transport agent of claim 8 wherein each allocated row of the array includes a column for storing predetermined network information including a localnet subnetwork ip address, a netmask and a localnet number entry, the Add FEPNET function being operative to generate and enter appropriate values for the localnet subnet ip address, netmask and localnet number entry as part of adding an entry to a row.

12. The transport agent of claim 10 wherein the Add FEPNET function sets the localnet subnetwork ip address value equal to a result of anding information included in a corresponding FEP table entry defining FEP ip address bits and FEP netmask bits, sets the localnet netmask equal to the FEP netmask value and increments by one, the localnet number entry.

13. The transport agent of claim 6 wherein the startup component upon completing storage of all entries in the FEP and FEPNET tables invokes the multihoming and routing component for building the routing tables in a predetermined manner in accordance with routing information contained in the pertinent information files constructed using administratively entered commands.

14. The transport agent of claim 13 wherein the routing tables include an FEP route hash table structure and the multihoming and routing component further includes an Add Route function, the Add Route function upon being invoked operates to create a node structure entry in the FEP route hash table, the node structure entry being constructed to contain predetermined values verified in a predetermined manner and being linked to the FEP route hash table.

15. The transport agent of claim 14 wherein the node structure entry containing the predetermined values which include a destination address value defining routes to specific host systems, networks including default routes, a gateway value defining a gateway IP address, an fepmask value having bit positions corresponding to the configured FEPs, an fepmask count value indicating a number of valid FEPs specified in the fepmask value and a metric value defining cost of route in hops.

16. The transport agent of claim 14 wherein the multihoming and routing component further includes a get route mask function invoked by a call from the transport service support component when an application process requests connection to one of the destination host systems, the get route mask function being operative to build a route mask structure in accordance with the information contained in the FEP route table entry for a particular route for return to the transport service support component along with the destination address of the host system.

17. The transport agent of claim 16 wherein the transport agent further includes a socket table structure having a plurality of locations indexed by socket numbers assigned to the application processes, each location being allocated to an application process when a socket is called using an unused location and used for maintaining items of context data including a set of transport endpoints on the configured FEPs which exist to support the socket, the transport service support component being operative to store the mask route structure along with the destination address in the location of the socket table allocated to the application process.

18. The transport agent of claim 17 wherein the multihoming and routine component further includes an FEP selection function, the FEP selection function being invoked by call from the transport service support component following receipt of the application process connection request which includes the previously passed mask route structure and the FEP selection function when invoked being operative to carry out selection of an FEP in a predetermined manner.

19. The transport agent of claim 18 wherein the selection of an FEP is carried out utilizing a pseudo random number.

20. The transport agent of claim 18 wherein the route mask structure includes a number of locations organized according to a predetermined metric, each location containing a count value designating a number of FEPs in the fep mask of the fep route table structure and a FEP mask value having bit positions set to a predetermined state for designating the valid FEPs for a particular metric value, the FEP selection function being operative in response to each call in which the connection to a FEP fails to reset a corresponding one of the bit positions of the FEP mask value until no further candidate FEPs can be found.

21. A method of constructing a transport agent for providing full multihoming support for processing network communication service requests from a number of application processes being run on a host system connected to communicate with a number of networks and subnetworks connected to an internetwork which connects to a number of destination host systems, the host system including a plurality of front end processors (FEPs), each FEP having a network protocol stack and being connected to either a different one of the networks or subnetworks or to a different portion of the same network or subnetwork so as to process communications network requests between the host system and the other host systems, the host system further including host operating system software having an application runtime interface and input/output supervisor and driver facilities, the transport agent being located between the runtime interface and supervisor and driver facilities and including a transport service support component operatively coupled to the runtime interface and to the input/output supervisor and driver facilities for servicing the communications network requests including establishing communications between application processes and processes running on the other host systems, the method comprising the steps of:

(a) including in the transport agent, a multihoming and routing component which operatively coupled to the transport service support component and to the FEPs;

(b) including a plurality of table structures operatively coupled to the multihoming and routing component, a first one of the table structures containing a plurality of locations initially configured to store static route information defining available connection paths to the destination host systems and a second one of the table structures containing a plurality of locations for storing entries indicating the FEPs of the plurality of FEPs configured in the host system; and (c) including in the transport service support component functions for invoking the multihoming and routing component in response to each predetermined type of request specifying that an application process wants to bind to any and all local host network addresses, the multihoming and routing component when invoked being operative to attempt to bind each configured FEP to the application process in accordance with the entries stored in the first and second tables, the multihoming and routing component upon successfully binding to one of the configured FEPs signaling the application process that binding has been completed while continuing to bind remaining configured FEPs to the application process so as to maintain path redundancy and increased load capacity during communications with destination host systems.

22. The method of claim 21 wherein the runtime interface utilizes sockets and the predetermined type of request includes a special constant INADDR_ANY for enabling the application process to receive information sent to any of the host system's IP addresses.

23. The method of claim 21 wherein the first table structure defines a number of routing tables and the second table structure defines a number of FEPs tables.

24. The method of claim 23 wherein the host system further includes a configuration file for storing pertinent information files defining configured FEPs and initial static routes, the transport agent further including a startup component operatively coupled to the transport service support component and to the multihoming and routing component, the method further including the steps of:

invoking the transport services support component and the multihoming and routing component by the startup component during reading of the contents of the files during host system initialization for building entries in the FEPs tables and routing tables in accordance with the contents of the pertinent information files.

25. The method of claim 24 wherein the method further includes the steps of:

invoking the multihoming and routing component upon completing storage of all entries in the FEP and FEP- NET tables for building the routing tables in a predetermined manner in accordance with routing information contained in the pertinent information files constructed using administratively entered commands.

26. The method of claim 25 wherein the routing tables include an FEP route hash table structure and the method further includes the step of:

including in the multihoming and routing component, an Add Route function which upon being invoked operates to create a node structure entry in the FEP route hash table, the node structure entry being constructed to contain predetermined values verified in a predetermined manner and being linked to the FEP route hash table.

27. The transport agent of claim 26 wherein the method further includes the step of:

including in the multihoming and routing component a get route mask function operative to build a route mask structure in accordance with the information contained in the FEP route table entry for a particular route for return to the transport service support component along with the destination address of the host system.

28. The method of claim 27 further including the step of:

including in the multihoming and routine component, an FEP selection function operative to carry out selection of an FEP in a predetermined manner utilizing a pseudo number value.

29. The method of claim 23 wherein the pertinent information files include a plurality of administratively entered ifconfig directives and the method further including the step of:

the transport service support component upon being invoked by the startup component creating the entries in the FEP tables based on processing the ifconfig directives pertaining to FEP interfaces.

30. The method of claim 29 wherein the method further includes the step of: to invoking the multihoming and routing component after creating entries in the FEP tables to add predetermined entries in a portion of the FEP tables for specifying multihoming FEP interface connections.

31. The method of claim 30 wherein the portion of the FEP tables defines a FEPNET table comprising an array structure having a plurality of rows and columns, each row allocated to represent a different subnetwork and the columns of each row for storing information defining the different multihoming FEP interfaces associated with the different subnetwork entered by the multihoming and routing component.

32. The method of claim 31 further including the steps of:

including in the multihoming and routing component an Add FEPNET entry function; next determining by the Add FEPNET function if that the subnetwork is being specified a first time by an ifconfig directive; and, upon determining that the subnetwork is specified a first time, allocating a next unused row of the array defined by an FEP index value to the subnetnetwork and adding an entry to a first column of the next row for the particular FEP interface.

33. The method of claim 32 further including the step of: adding an entry for the particular FEP interface to an appropriate one of the columns of the row allocated to the subnetwork upon determining that the subnetwork has been previously specified by an ifconfig directive.

* * * * *